United States Patent [19]

Horowitz et al.

[11] 4,203,871
[45] May 20, 1980

[54] METHOD OF MAKING LEAD AND BISMUTH RUTHENATE AND IRIDATE PYROCHLORE COMPOUNDS

[75] Inventors: Harold S. Horowitz, Clark; John M. Longo, New Providence; Joseph T. Lewandowski, Middlesex, all of N.J.

[73] Assignee: Exxon Research & Engineering Co., Florham Park, N.J.

[21] Appl. No.: 956,744

[22] Filed: Nov. 1, 1978

Related U.S. Application Data

[63] Continuation-in-part of Ser. No. 856,648, Dec. 2, 1977, Pat. No. 4,129,525.

[51] Int. Cl.$^2$ .............................................. H01B 1/08
[52] U.S. Cl. .................................... 252/518; 423/593; 429/40
[58] Field of Search ....................... 252/518; 423/593; 429/40

[56] References Cited

U.S. PATENT DOCUMENTS

| | | | |
|---|---|---|---|
| 3,305,402 | 2/1967 | Jones et al. | 429/44 |
| 3,405,010 | 10/1970 | Kordesch et al. | 429/44 |
| 3,536,533 | 10/1970 | Kitamura | 429/40 |
| 3,682,840 | 8/1972 | Van Loan | 252/518 |
| 3,769,382 | 10/1973 | Kuo et al. | 264/61 |
| 3,896,055 | 7/1975 | Bouchard et al. | 252/518 X |
| 3,951,672 | 4/1976 | Langley et al. | 252/514 X |

OTHER PUBLICATIONS

Trehoux, Jacques et al. "C. R. Acad. Sc. Paris", vol. 281 (15 Sep. 1975) Series C-379.
Morgenstern-Badarau, Irene et al. "C. R. Acad. Sc. Paris", 271 (23 Nov. 1970) 1313-1316.
Morgenstern-Badarau, I. et al. "Ann. Chin." vol. 6: 109-113 (1971).
Trehoux, Jacques et al. "Journal of Solid State Chemistry", 21: 203-209 (1977).
Bouchard, R. J. et al. "Mat. Res. Bull.", vol. 6, pp. 669-680, 1971.
Sleight, A. W. "Mat. Res. Bull.", vol. 6, p. 775 (1971).
Longo, J. M. et al. "Mat. Res. Bull.", vol. 4, pp. 191-202, 1969.
O'Grady, W. et al. "Ruthenium Oxide Catalysts for the Oxygen Electrode", Contract No. N00014-67-A-04-04-0006 (AD-779-899) Office of Naval Research, May 1, 1974.

*Primary Examiner*—E. Suzanne Parr
*Attorney, Agent, or Firm*—Kenneth P. Glynn

[57] ABSTRACT

A liquid solution method of preparing electrically conductive pyrochlore compounds having the formula:

$$A_2[B_{2-x}A_x]O_{7-y}$$

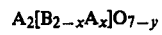

is disclosed wherein A is selected from lead, bismuth and mixtures thereof, B is selected from ruthenium, iridium and mixtures thereof, $0 \leq X \leq 1.0$ and $0 \leq y \leq 1$. The method involves reacting A and B cations to yield a pyrochlore oxide by precipitation of A and B cations in a liquid medium having a pH which is equal to or greater than 4.5, but less than 13.5, in the presence of an oxygen source at a temperature below about 200° C. for a time sufficient for reaction to occur. In those instances in which amorphous reaction products are obtained, these amorphous reaction products are subsequently heat treated at a temperature of about 200° C. to about 600° C. for a time sufficient to convert amorphous reaction products to crystalline pyrochlore(s).

21 Claims, No Drawings

METHOD OF MAKING LEAD AND BISMUTH RUTHENATE AND IRIDATE PYROCHLORE COMPOUNDS

CROSS REFERENCE TO RELATED APPLICATIONS

This application is a continuation-in-part of U.S. Ser. No. 856,648, filed Dec. 2, 1977, entitled "Method of Making Lead-Rich and Bismuth-Rich Pyrochlore Compounds Using An Alkali Medium", now U.S. Pat. No. 4,129,525.

BACKGROUND OF THE INVENTION AND PRIOR ART STATEMENT

The present invention is directed to a method of preparation of pyrochlore structure compounds. Most particularly, the present invention is directed to a method of preparing lead and bismuth ruthenate and iridate pyrochlores. These pyrochlores have many uses including use as oxygen electrodes in electrochemical devices.

A number of various types of electrochemical devices have been developed over the past few years for the production of electrical energy by electrochemical reaction and obversely for the consumption of electrical energy to effectuate electrochemical reactions. Many of these devices rely upon a reaction involving oxygen (or air) as part of the mechanism to accomplish the desired result. For example, such devices may contain oxygen electrodes which are oxygen reducing cathodes in which oxygen is catalytically electroreduced. Alternatively, such devices may contain oxygen electrodes which catalyze the evolution of oxygen from water. In general, these electrodes are known in the art as oxygen electrodes. Thus, metal-oxygen batteries, metal-air batteries, fuel cells, electrolyzers, metal electrowinning devices, etc., are among the well-known electrochemical devices which may contain oxygen electrodes. Typically, such devices contain electrocatalyst materials at one or more of their electrodes and precious metals, such as platinum (on carbon support) and silver (on carbon and other supports), are frequently, employed as electrocatalysts.

In addition, various electrocatalytic alloys, compounds and compound mixtures have been developed for these electrochemical devices to achieve more desirable systems. For example, U.S. Pat. No. 3,536,533 (Kitamura) describes the use of an alloy of gold, silver, palladium and at least one of platinum, rhodium and ruthenium as a fuel cell electrode electrocatalyst, and U.S. Pat. No. 3,305,402 (Jones et al.) describes the use of a combination of platinum and ruthenium oxides as an electrocatalyst. However, both references describe these catalysts as fuel cell anode (or fuel oxidation) catalysts. O'Grady et al., Technical Report No. 37, "Ruthenium Oxide Catalysts For The Oxygen Electrode", Contract No., N0014-67-A-0404-0006 (AD-779-899) Office of Naval Research, May, 1974 (National Technical Information Service) describes the use of ruthenium oxide as an electrochemical catalyst for both the generation of oxygen and the reduction of oxygen. U.S. Pat. No. 3,405,010 (Kordesch et al.) teaches that spinel-type electrode catalysts have been found to produce better activation of the electrode and improved electrolyte repellency of the electrode by the inclusion of ruthenium.

The foregoing prior art describes various types of electrodes including those which utilize iridium and/or ruthenium-containing catalysts. However, none of these references teaches or renders obvious the method of preparation as claimed herein.

Heretofore, many pyrochlore compounds such as the pyrochlore compounds $Pb_2Ru_2O_{7-y}$ (lattice parameter of 10.253 Å), $Pb_2Ir_2O_{7-y}$ (lattice parameter of 10.271 Å), $Bi_2Ir_2O_{7-y}$, $Bi_2Rh_2O_{7-y}$, $Pb_2Rh_2O_{7-y}$, $Pb_2Pt_2O_{7-y}$ and $Cd_2Re_2O_{7-y}$, commonly referred to as lead ruthenate, lead iridate, bismuth iridate, bismuth rhodate, lead rhodate, lead platinate and cadmium rhenate, respectively, and similar compounds, have been known. For example, Longo, Raccah and Goodenough, *Mat. Res. Bull.*, Vol. 4, pp. 191-202 (1969), have described the compounds $Pb_2Ru_2O_{7-y}$ and $Pb_2Ir_2O_{7-y}$ and their preparation at elevated temperatures which are in excess of 700° C. Sleight, *Mat. Res. Bull.*, Vol. 6, p. 775 (1971) has also described the compounds $Pb_2Ru_2O_{7-y}$ and $Pb_2Ir_2O_{7-y}$ (including the pyrochlore compound $Pb_2Ru_2O_{6.5}$ having a lattice parameter of 10.271 Å) and their preparation at 700° C. and 3000 atmospheres of pressure. U.S. Pat. No. 3,682,840 (Van Loan) describes the preparation of lead ruthenate at temperatures of 800° C. and higher. These references do not teach that lead-rich or bismuth-rich compounds made by the present invention exist or that any of the pyrochlore compounds described herein may be prepared at temperatures below about 600° C. in the manner described and claimed herein.

U.S. Pat. Nos. 3,769,382 (Kuo et al.) and 3,951,672 (Langley et al.) both disclose the preparation of lead ruthenate and lead iridate using various techniques at temperatures of at least about 600° C., and preferably at higher temperatures. However, these references fail to recognize that the lead pyrochores may be obtained at generally lower temperatures, as described herein.

Bouchard and Gillson, *Mat. Res. Bull.*, Vol. 6, pp. 669-680 (1971) describe $Bi_2Ru_2O_7$ and $Bi_2Ir_2O_7$ preparation and properties, including the fact that these compounds have high conductivity and small Seebeck coefficients. However, there is no teaching that these compounds are useful electrocatalysts in electrochemical devices. Derwent's Basic Abstract Journal, Section E. Chemdoc, Week No. Y25, Abstract No. 320 (Aug. 17, 1977), Derwent Accession No. 44866Y/25 describes electrodes for electrolysis of alkaline and carbonate solutions which comprise nickel-plated steel strips coated with high conductivity layers containing $Cd_2Re_2O_7$, $Pb_2Re_2O_7$ or $Ni_2Re_2O_7$. These compounds are prepared by impregnating perrhenic acid and a metal nitrate such as Cd nitrate onto a nickel strip and baking at 350° C. However, these compounds are all rhenates rather than ruthenates or iridates and are not taught to be prepared by the method of the present invention. National Bureau of Standards, Washington, D.C., Institute for Mat. Research, Abstract of Rept. No. NBSIR-75-742 (1974) describes the use of mixed oxides as oxygen-reducing electrocatalysts in acid fuel cells, including the use of barium ruthenate. However, of all materials suggested for such electrocatalysts, none are of the pyrochlore-type structure compounds made by the method of the present invention.

Trehoux, Abraham and Thomas, *Journal of Solid State Chemistry*, Vol. 21, pp. 203-209 (1977) and C. R. Acad. Sc. Paris, t. 281 pp. 379-380 (1975) describe the solution preparation of a pyrochlore compound of the formula III III V
$K_{1.14}Bi_{0.27}[Bi_{0.27}Bi_{1.73}][O_{4.9}OH_{1.1}]OH_{0.8}$.

The synthesis is carried out by adding a bismuth nitrate solution to a solution of 17% potassium hydroxide containing an excess of potassium hypochlorite. The reaction is carried out in this medium for 2 hours in a reflux type of apparatus at a temperature slightly higher than 100° C. The method of synthesis and the product prepared are different in many respects from the synthesis method and products herein. The compound prepared in the cited reference is not an oxide but rather an oxyhydroxide which has a significant amount of protons incorporated into the bulk structure. Proton nuclear magnetic resonance experiments on the materials of the present invention show that they are oxides which do not have significant amounts of protons incorporated into the structure. The pyrochlore synthesized by Trehoux et al. is not a ruthenium or iridium containing compound and, in fact, is believed not to be an electrically conductive pyrochlore. The potassium hydroxide solution used in the Trehoux reference serves not only as a reaction medium but also as a constituent in the reaction since potassium is incorporated into the A site of the pyrochlore. In the method of the present invention where an alkali solution is employed, it is solely a reaction medium with no measurable amount of alkali metal cations incorporated in the pyrochlore compound which results from the synthesis.

Morgenstern-Badarau and Michel, *Ann. Chim.*, Vol. 6, pp. 109 et seq. (especially at 109–113) (1971), and *C. R. Acad. Sc. Paris*, Vol. 271, Seire C pp. 1313–1316 (1970) report the solution preparation of pyrochlore compounds having the formula $Pb_2Sn_2O_6 \cdot xH_2O$ where $0 < x < 1$. The conditions of preparation are strictly defined as follows: equimolar quantities of lead and tin are reacted from solution in the presence of the complexing agent nitrilo-triacetic acid (NITA) such that the concentration of $[NITA]/[Pb^{2+}] = 2$. The pH of the reaction medium is fixed at 11 and the reaction is carried out for several hours at 80° C. The compound prepared by Morgenstern-Badarau et al. is a hydrated oxide whereas materials made by the method of the present invention are oxides. The pyrochlore prepared in this reference, while it does contain lead, is not a lead ruthenate or iridate pyrochlore material prepared by the method of the present invention. In fact, the pyrochlore prepared by Morgenstern-Badarau and Michel is believed not to be electrically conductive. Morgenstern-Badarau et al. also specifically state that their preparation method is one which gives a solid product containing $Pb^{2+}$. The method of the present invention is such that the solid product may contain a mixture of $Pb^{2+}$ and $Pb^{4+}$. While the presence of a complexing agent is required in the synthesis described in the cited reference, no such complexing agent is required in the method of preparation of the present invention.

In summary, there exists a formidable body of prior art describing the existence of various pyrochlores, their potential uses including uses as dielectric materials, and describing various metals and metal oxides as electrocatalyst materials. Notwithstanding such prior art, there is no suggestion or teaching that lead or bismuth ruthenate and iridate pyrochlore compounds may be made by the method of the present invention.

DESCRIPTION OF THE PRESENT INVENTION

The present invention is directed to a method of preparing compounds having the formula:

$$A_2[B_{2-x}A_x]O_{7-y} \tag{1}$$

wherein A is selected from the group consisting of lead, bismuth and mixtures thereof, B is selected from the group consisting of ruthenium, iridium and mixtures thereof, and wherein x is a value such that $0 \leq x \leq 1.0$ and y is a value such that $0 \leq y \leq 1$.

The compounds made by the method of the present invention, as represented by formula (1) above, display the pyrochlore crystal structure. Pyrochlore structure oxides are represented by the general formula $A_2B_2O_6O'$ wherein A and B are metal cations. A detailed description of their crystallographic structure may be found in Structural Inorganic Chemistry, Fourth Edition by A. F. Wells, Clarendon Press, Oxford, 1975. Briefly, oxides of this type display a face-centered cubic structure having a unit cell dimension of about 10 Å. The B cations are octahedrally coordinated by oxygen anions (O). The structural framework is formed by a three dimensional array of these corner shared octahedra, each sharing corners with six others. This framework has the composition $B_2O_6$. As Wells describes, this framework of octahedra is "based on the diamond net, having large holes which contain the O' and two A atoms, which themselves form a cuprite-like net $A_2O'$ interpenetrating the octahedral framework". The octahedra are actually arranged in tetrahedral clusters. These clusters of octahedra are then tetrahedrally arranged so as to form the large holes in the structure described by Wells. Each of these large holes may also be defined by four tetrahedrally arranged puckered, hexagonal rings which are formed by the corner shared octahedra. The A cations reside in the center of these puckered hexagonal rings and are coordinated by the six O anions which define the rings plus two more O' cations at a slightly different distance. These O' anions reside at the center of the large holes in the octahedral framework. It is the O' anions which may be partially or totally absent, leading to the general pyrochlore oxide formula $A_2B_2O_{7-y}$ where $0 < y < 1$. Thus, the compounds made by the method of the present invention are referred to as pyrochlore compounds, some being stoichiometric pyrochlores, and others being lead-rich and/or bismuth-rich compounds of the formulas as above.

It has been discovered that the lead-rich and/or bismuth-rich pyrochlore compounds made by the method of the present invention exhibit an expanded lattice, believed to be a result of the increased amount of lead or bismuth in the crystal structure. In fact, it is believed that there exists a direct correlation between the extent of expansion of the lattice and the amount of excess lead or bismuth in the crystalline structure. Thus, it is believed that all things otherwise being equal, the greater the lattice parameter, the greater the amount of lead or bismuth and, therefore, the larger the variable x in the formula representing the compounds of the present invention. This belief is supported by the fact that all pyrochlores, in which the lead to ruthenium molar ratio is greater than 1, made by the method of the present invention, for which lattice parameters have been determined, do indeed exhibit expanded lattices.

In general terms, the method of the present invention involves reacting A and B cations to yield a pyrochlore oxide by precipitation of A and B cations in a liquid medium within a specified pH range, in the presence of an oxygen source at a temperature below about 200° C. for a sufficient time for reaction to occur. The synthesis occurs in a solution medium where the reaction kinetics are quite favorable and not so restrictive as is found in solid state reactions notwithstanding the low reaction temperature employed in the present method. These conditions result either in the formation of crystalline pyrochlore or amorphous or partially amorphous reaction products. If amorphous reaction products are obtained, they may subsequently be converted to crystalline pyrochlore material by appropriate heat treatment.

The starting material A and B cation reactants may be both in solid form or either a solid A cation reactant source or a solid B cation reactant source may be used with the other in liquid solution (aqueous) form. Alternatively, an aqueous solution source of A and B cations may be employed.

The solid A cation reactant source is meant by definition to include any solid which will provide ionic A cations for reaction in the specified liquid alkali medium. Among the A cation reactant sources which may be used are lead nitrate, lead monoxide, lead dioxide, lead chloride, lead acetate, lead tetraacetate, lead carbonate, lead citrate, lead oxalate, bismuth nitrate, bismuth trioxide, bismuth pentoxide, bismuth chloride, bismuth oxalate and bismuth oxychloride, and mixtures thereof. Of these, lead dioxide, lead tetraacetate, lead nitrate, bismuth nitrate and bismuth pentoxide are preferred. In general, the choice of solid source size is a matter of choice, depending upon the rate of reaction desired. As a practical matter, the solid reactant source should be in powdered form, with surface area being in the range of about 0.1 to about 200 $m^2/g$ and preferably about 50 to about 200 $m^2/g$.

The solid B cation reactant source is meant by definition to include any solid which will provide ionic B cations for reaction in the specified liquid alkali medium. Among the B cation reactant sources which may be used are ruthenium oxide, ruthenium oxyhydroxide, ruthenium chloride, ruthenium nitrate, ruthenium nitrosyl nitrite, iridium chloride, iridium hydroxide, and iridium oxide acid and mixtures thereof. Of these, ruthenium nitrate, ruthenium oxyhydroxide and iridium chloride are preferred. Concerning surface area considerations, the comments above concerning the solid A cation reactant sources is applicable.

The aqueous solution source of reactant (A and B) cations is meant by definition to include any aqueous solution which will dissolve ionic A and B cations. This metal cation containing solution may be prepared using A source materials which include lead nitrate, lead oxide, lead chloride, lead acetate, lead carbonate, lead citrate, lead oxalate, bismuth nitrate, bismuth oxide, bismuth chloride, bismuth oxalate and bismuth oxychloride as well as mixtures thereof. Desirably, the A source material used in preparing the aqueous solution source of A and B cations is either a lead source material or a bismuth source material, although, as mentioned, mixtures of these may be used. Among the mentioned A source materials, preferred are lead and bismuth nitrates. The B source materials used in preparing the aqueous solution source of A and B cations include ruthenium chloride, ruthenium nitrate, ruthenium nitrosyl nitrite, iridium chloride, iridium hydroxide and iridium oxalic acid as well as mixtures thereof. Desirably, the B source material is either a ruthenium source or an iridium source, although mixtures thereof may be employed. The preferred B source materials include ruthenium nitrate and iridium chloride.

The aqueous solution source of A and/or B cations is prepared by dissolving appropriate amounts of A source material and/or B source material in aqueous solvent. In some cases water is adequate for this dissolution. When necessary, the A and/or B source materials may be dissolved in aqueous acid solutions, the acid solutions being just strong enough to cause the A and/or B source materials to dissolve. Acids such as nitric or hydrochloric may be used but nitric acid is preferred.

The A source material and B source material whether both are liquid, both are solid, or one in liquid and the other solid, are in an initial reactant A to B ion ratio of at least about 1.0:1.0. Desirably, this ratio is within the range of about 1.05:1.0 to about 15.0:1.0. In the preferred embodiments the A to B ion ratio is in the range of about 1.2:1.0 to about 10.0:1.0. As a practical matter, the reactants may be used in an A to B ion ratio appreciably higher than the ratio of A to B in the final pyrochlore product.

Preferably, an aqueous solution of A and B cations is used and preparation of the aqueous solution source of A and B cations in the manner just described assures atomic scale mixing of these cations and thereby provides favorable kinetics for the low temperature, solution medium synthesis that follows.

The liquid medium is meant by definition to include any liquid medium which will promote reaction between the A ions and B ions from the mentioned aqueous solution source of A and B cations or from the solid reactant sources of A and B cations and will effect the reaction to yield the desired pyrochlore structure and/or amorphous pyrochlore precursors. The liquid medium may be any which satisfies this definition and has a pH which is equal to or greater than about 4.5 and less than about 13.5. Typically, an aqueous solution is employed and the pH may be adjusted as desired by adding acid or base. In general, the source materials are acidic and may be added to appropriate alkaline material in order to yield a liquid reaction medium having the appropriate pH. For example, the acidic source materials may be added to alkali metal hydroxides. Thus, the alkaline metal hydroxide source may desirably be an aqueous basic solution containing a base selected from the group consisting of sodium hydroxide, rubidium hydroxide, cesium hydroxide, potassium hydroxide and mixtures thereof. Desirably, sufficient base is included so as to render a liquid alkaline medium having a pH which is greater than about 7.5 and less than about 13.5. The objective for preferred practice of this invention is to add the reactant source or sources to a solution having the appropriate alkalinity or acidity such that the resulting liquid reaction medium has the desired pH falling in the range of equal to or greater than 4.5 but less than 13.5.

It is also found to be helpful, although not necessary, to saturate the liquid reaction medium with respect to one or more of the reactant cations (and especially with respect to the most alkali soluble cation reactant) prior to combination of the source of A and B cations with the liquid reaction medium. This may be done so as to avoid large discrepancies between cation ratios in the reacted product and in the initial reactant mixture due to possible solubility in the reaction medium of one or more of the reactant cations.

The liquid medium, e.g., with acid and/or base constituents, acts solely as a reaction medium and not as a constituent in the reaction. This is supported by the fact that the pyrochlores made by the method of this invention show less than 0.02% (by weight) alkali metal cation as measured by atomic absorption when an alkaline solution reaction medium is employed.

The oxygen source is meant to include by definition any source which will provide the oxygen needed to form the pyrochlore compound. The oxygen source may be any of the A source material, the B source material, the liquid reaction medium or combinations thereof. Alternatively or additionally, the oxygen source may be or include independent oxygen contributing material, e.g., bubbled oxygen or oxygen-containing salts or other additives. In any event, an essential aspect of the present invention compound preparation is the inclusion of adequate oxygen to permit the formation of the desired pyrochlore structure.

No criticality exists as to whether the source of A cations or B cations or both is added to the liquid reaction medium or whether the liquid reaction medium is first added to one or more sources of reactant cations. However, the former is usually practiced to insure that all of the cations see an excess of liquid reaction medium. In general, at least about 1.0 liter of liquid medium is used per sum total mole of metal cation reactant. As mentioned, the reaction may be carried out at temperatures below about 200° C. Desirably, the reaction temperature is within the range of about 10° to about 100° C. Preferably, the reaction is carried out at temperatures within the range of about 50° to about 80° C.

During the reaction period the liquid reaction medium may be replaced with fresh liquid reaction medium although this is not necessary for successful practice of the invention.

The reaction is carried out for a time sufficient for reaction to occur. With many reactant combinations, at least a partial reaction occurs almost instantly. In any event, the length of time over which the reaction should be allowed to proceed is a matter of choice. Within limits, however, the longer the reaction time, the greater the extent of reaction. As a practical matter, a significant amount of reaction product is obtained by reacting for about 1 hour, and generally a reaction time of about 2 hours to about 7 days is advantageous. After the reaction is completed, the reaction product may optionally be separated by known separation means. These separation techniques include filtration and centrifugation. If the synthesis has been carried out in a liquid medium having a pH equal to or greater than 4.5, but less than about 10.0, the resulting product obtained is an amorphous or partially amorphous material of lead and/or bismuth ruthenate and/or iridate, with possibly some other oxides present. If the synthesis has been carried out in a liquid medium having a pH equal or greater than 10.0, but less than 13.5, the resulting product obtained will not necessarily be amorphous or partially amorphous. Under certain conditions of synthesis, reaction products obtained from liquid media in this pH range will be fully crystalline pyrochlores. The synthesis parameters which are most critical in determining the extent of crystallinity of reaction products resulting from syntheses in this pH range are temperature, time, and oxidizing potential (e.g., availability of oxygen). Within this pH range, syntheses carried out at higher temperatures ($\geq 75°$ C.), for longer times ($\geq 3$ days), and with high availability of oxygen (e.g., oxygen bubbling through the reaction medium) will generally yield crystalline pyrochlore reaction products. On the other hand, synthesis at lower temperatures, for shorter times, and with lower availability of oxygen will generally yield amorphous or partially amorphous reaction products.

If the reaction product is fully crystalline pyrochlore, no subsequent heat treatment is necessary. However, amorphous or partially amorphous reaction products, whether synthesized from the pH range between 4.5 and 10.0 or the pH range between 10.0 and 13.5, must be heat treated in order to obtain the desired crystalline structure. This heat treatment will be at a temperature generally in the range of about 200° to about 600° C. in an inert or oxygen containing atmosphere. Among the possible heat treatment atmospheres are air, oxygen, nitrogen, argon, helium and the like. It must be recognized that in the family of pyrochlores, $A_2[B_{2-x}A_x]O_{7-y}$, the value of x may be dependent on the maximum heat treatment temperature to which the material is subjected. For example, as the temperature increases, the maximum value of x that may be stabilized will decrease. It is, therefore, necessary to employ heat treatment temperatures which lie below the decomposition temperatures of the specific pyrochlores that one wishes to synthesize, and the more A cation-rich the pyrochlore, the lower will be the maximum allowable heat treatment temperature. Desirably the amorphous product is heat treated at about 200° C. to 500° C. and preferably at about 300° C. to 400° C. in an oxidizing atmosphere such as air or oxygen. The heat treatment may be performed for at least about 1 hour to achieve some measurable crystalline formation, although to achieve substantial crystal formation, heat treatment for at least about 2 hours to about 16 hours is desirable.

Various post treatments may be employed as desired. These might include additional heat treatments to improve the crystallinity of the product and/or washing in various media in order to leach out any unreacted metal species.

The final reaction product includes one or more of the pyrochlore compounds of formula (1) above. When preferred amounts of reactants are employed, compounds of formula (1) may be obtained wherein $0 \leq x \leq 1.0$. Thus, among the compounds obtained are:

$$Pb_2[Ru_{2-x}Pb_x]O_{7-y} \qquad (2)$$

$$Pb_2[Ir_{2-x}Pb_x]O_{7-y} \qquad (3)$$

$$PbBi[Ru_{2-x}Pb_x]O_{7-y} \qquad (4)$$

$$PbBi[Ir_{2-x}Pb_x]O_{7-y} \qquad (5)$$

$$Pb_aBi_b[Ru_{2-x}Pb_x]O_{7-y} \qquad (6)$$

$$Pb_2[Ru_{2-x}(Pb_cBi_d)_x]O_{7-y} \qquad (7)$$

and the like, wherein x and y are as defined, and wherein $a+b=2$ and $c+d=x$. Also, included are the bismuth and bismuth-rich counterparts to the foregoing and other variations within the scope of formula (1) which should now be apparent to the artisan. As mentioned, the above pyrochlores, the lead and/or bismuth-rich produced by the method of the present invention have an expanded lattice and exhibit a high surface area. Also, all of the compounds obtained by the method of the present invention display high electronic conductivity, thus making them particularly useful for electrode applications, e.g., as oxygen electrodes.

The present invention will be more fully appreciated in view of the following examples. However, these examples are presented for illustrative purposes, and the present invention should not be construed to be limited thereto:

EXAMPLE 1

A lead-rich pyrochlore, e.g., $Pb_2[Ru_{2-x}Pb_x]O_{7-y}$, is prepared as follows:

$Pb(NO_3)_2$ and $Ru(NO_3)_3$ are combined in aqueous solution in an approximately 2.0:1.0 molar ratio of lead to ruthenium. That is, about 3.28 grams of $Pb(NO_3)_2$ and about 1.42 grams of $Ru(NO_3)_3$ (in aqueous solution) are added to 125 ml of distilled water. This solution after being stirred, is then added, with stirring, to 460 ml of 0.3 M potassium hydroxide and heated to 75° C. Precipitation of a solid occurs immediately. The pH of this reaction medium is measured to be 13.0. The reaction is carried out, with stirring, for approximately 20 hours. The solid is then separated by vacuum filtration, washed in distilled water, and dried at 100° C. The pH of the filtrate is measured to be 12.9. X-ray diffraction shows that the reacted product is largely amorphous, the only discernible feature in the x-ray diffraction spectrum being a very broad, diffuse peak centered at about 30° $2\frac{1}{4}$. When the material is heat treated for 2 hours at 400° C. in air, x-ray diffraction shows that the heat treated product is a crystalline pyrochlore with a lattice parameter of 10.473 Å. The lead to ruthenium molar ratio, as determined experimentally by x-ray fluorescense, is 1.96±0.05:1.0. The formula for this pyrochlore can thus be written as $Pb_2[Ru_{1.35}Pb_{0.65}]O_{7-y}$.

EXAMPLE 2

To illustrate the utility of the compound which is obtained by the method of Example 1, electrocatalytic performance curves are obtained in 3 N KOH at 75° C. In these tests, the material is fabricated into test electrodes consisting of the catalyst, a binder, a wetproofing agent and a support. Teflon serves as both a binder and wetproofing agent for all the electrodes tested. Gold expanded metal screen is used as the support.

Electrodes are fabricated by mixing a weighed amount of catalyst with a few drops of water, adding a measured volume of Teflon 42 suspension, and mixing vigorously to precipitate the Teflon. The gummy product is then spread on weighed gold Exmet screen and is pressed dry between filter paper. The electrode is then cold pressed for 0.5 min. at 200 psi, is allowed to air dry for 30 min. and is then hot pressed in an inert atmosphere at 325° C., 500 psi for 0.5 min. After cooling, the electrode is weighed to determine its loading and then placed in the electrochemical cell for testing.

The electrochemical half-cell used for testing is of the interface maintaining type and consists of a jacketed liquid phase cell compartment. The liquid side contains the platinum wire counter electrode, a saturated calomel reference electrode (in contact by Lugin capillary), and magnetic stirrer. The gas side contains the gas (oxygen) inlet and outlet and a stopcock to drain off any condensate. The working electrode is held in place (between the two compartments) between two Teflon discs with a gold current collector pressing against it.

The cell is connected to a Princeton Applied Research Model 173 potentiostat with a programmer and logarithmic current converter. Constant rate potential sweep measurements are conducted. Outputs of potential and log of current are recorded on an x-y plotter, and the resulting potential vs. log current density plot, referred to as a performance curve, is used to evaluate the electrode activity.

Table I shows performance data for the electrocatalytic reduction of oxygen in 3 M KOH at 75° C. using the lead-rich lead ruthenate pyrochlore of Example 1. The data in Table I show that the pyrochlore of Example 1 does have significant electrochemical activity for oxygen reduction.

TABLE I

ACTIVITY DATA FOR THE ELECTRO-REDUCTION OF OXYGEN IN 3M KOH AT 75° C.

| Current Density (mA/cm$^2$) | Potential (mV vs. RHE) |
|---|---|
| 0.5 | 1025 |
| 1.0 | 1025 |
| 5.0 | 950 |
| 10 | 929 |
| 25 | 908 |
| 50 | 891 |
| 100 | 871 |
| 200 | 842 |

EXAMPLE 3

A lead-rich pyrochlore, e.g., $Pb_2[Ru_{2-x}Pb_x]O_{7-y}$, is prepared as follows:

$Pb(NO_3)_2$ and $Ru(NO_3)_3$ are combined in aqueous solution in an approximately 2.0:1.0 molar ratio of lead to ruthenium. That is, about 3.28 grams of $Pb(NO_3)_2$ and about 1.42 grams of $Ru(NO_3)_3$ (in aqueous solution) are added to 125 ml of distilled water. This solution after being stirred, is then added, with stirring, to 460 ml of 0.3 M KOH and heated to 75° C. Precipitation of a solid occurs immediately. The pH of this reaction medium is measured to be 13.0. The reaction is carried out, with stirring and with oxygen being bubbled through the solution for approximately 20 hours. The solid is then separated by vacuum filtration, washed in distilled water, and dried at 100° C. The pH of the filtrate is measured to be 13.0. X-ray diffraction shows that the reacted product is a crystalline pyrochlore with a lattice parameter of 10.478 Å. The lead to ruthenium ratio, as determined experimentally by x-ray fluorescence, is 2.05±0.05:1.0. The formula for this pyrochlore can thus be written as $Pb_2[Ru_{1.31}Pb_{0.69}]O_{7-y}$. The surface area, measured by the BET $N_2$ adsorption method, is 63 m$^2$/g.

EXAMPLE 4

A lead-rich pyrochlore, e.g., $Pb_2[Ru_{2-x}Pb_x]O_{7-y}$, is prepared as follows:

$Pb(NO_3)_2$ and $Ru(NO_3)_3$ are combined in aqueous solution in an approximately 1.2:1.0 molar ratio of lead to ruthenium. That is, about 1.97 grams of $Pb(NO_3)_2$ and about 1.42 grams of $Ru(NO_3)_3$ (in aqueous solution) are added to 125 ml of distilled water. This solution after being stirred, is then added with stirring to about 300 ml of 0.3 M potassium hydroxide and heated to 75° C. Precipitation of a solid occurs immediately. The pH of this reaction medium is measured to be 12.9. The pH is adjusted downwards to 12.0 by adding about 5 ml of concentrated nitric acid. The reaction is carried out with stirring for 4 days. The solid is then separated by vacuum filtration, washed in distilled water, and dried at 100° C. The pH of the filtrate is measured to be 10.4.

X-ray diffraction shows that the reacted product is a pyrochlore, but is only partially crystalline. When the material is heat treated for 2 hours at 400° C. in air, x-ray diffraction shows that the heat treated product is a crystalline pyrochlore with a lattice parameter of 10.329 Å. The formula of this pyrochlore is estimated, on the basis of a previously established correlation between lattice parameter and composition for lead ruthenate pyrochlores, to be $Pb_2[Ru_{1.79}Pb_{0.21}]O_{7-y}$.

EXAMPLE 5

Table II shows performance data for the electrocatalytic reduction of oxygen in 3 M KOH at 75° C. using the compound obtained by the method of Example 4, thereby illustrating the utility of this catalyst.

TABLE II
ACTIVITY DATE FOR THE ELECTRO-REDUCTION OF OXYGEN IN 3M KOH AT 75° C.

| Current Density (mA/cm$^2$) | Potential (mV vs. RHE) |
| --- | --- |
| 0.5 | 1050 |
| 1.0 | 1050 |
| 5.0 | 949 |
| 10 | 930 |
| 25 | 902 |
| 50 | 876 |
| 100 | 839 |
| 200 | 772 |

EXAMPLE 6

A lead-rich pyrochlore, e.g., $Pb_2[Ru_{2-x}Pb_x]O_{7-y}$, is prepared as follows:

$Pb(NO_3)_2$ and $Ru(NO_3)_3$ are combined in aqueous solution in an approximately 1.2:1.0 molar ratio of lead to ruthenium. That is, about 1.97 grams of $Pb(NO_3)_2$ and about 1.42 grams of $Ru(NO_3)_3$ (in aqueous solution) are added to 125 ml of distilled water. This solution, after being stirred, is then added with stirring to 335 ml of 0.2 M potassium hydroxide and heated to 75° C. Precipitation of a solid occurs immediately. The pH of this reaction medium is measured to be 12.5. The reaction is carried out, with stirring, for 5 days. The solid is then separated by vacuum filtration, washed in distilled water, and dried at 100° C. The pH of the filtrate is measured to be 12.1. X-ray diffraction shows that the reacted product is a crystalline pyrochlore with a lattice parameter of 10.347 Å. The formula of this pyrochlore is estimated, on the basis of a previously established correlation between lattice parameter and composition for lead ruthenate pyrochlores, to be $Pb_2[Ru_{1.72}Pb_{0.28}]O_{7-y}$. A 2 hour heat treatment at 400° C. in air does not change the pyrochlore, but does crystallize a minor impurity phase of $RuO_2$.

EXAMPLE 7

A lead-rich pyrochlore, e.g., $Pb_2[Ru_{2-x}Pb_x]O_{7-y}$, is prepared as follows:

$Pb(NO_3)_2$ and $Ru(NO_3)_3$ are combined in aqueous solution in an approximately 1.35:1.0 molar ratio of lead to ruthenium. That is, about 2.21 grams of $Pb(NO_3)_2$ and 1.42 grams of $Ru(NO_3)_3$ (in aqueous solution) are added to 125 ml of distilled water. This solution, after being stirred, is then added with stirring to about 280 ml of 0.2 M potassium hydroxide, and heated to 75° C. Precipitation of a solid occurs immediately. The pH of this reaction medium is measured to be 12.0. The reaction is carried out, with stirring and with oxygen being bubbled through the solution for 5 days. The solid is then separated by vacuum filtration, washed in distilled water, and dried at 100° C. The pH of the filtrate is measured to be 10.2. X-ray diffraction shows that the reacted product is a crystalline pyrochlore. A 2 hour heat treatment at 400° C. in air does not significantly change the pyrochlore, but does crystallize a minor impurity phase of $RuO_2$. The lattice parameter of this pyrochlore is 10.374 Å and the composition is estimated, on the basis of a previously established correlation between lattice parameter and composition for lead ruthenate pyrochlores, to be $Pb_2[Ru_{1.65}Pb_{0.35}]O_{7-y}$.

EXAMPLE 8

A lead-rich pyrochlore, e.g., $Pb_2[Ru_{2-x}Pb_x]O_{7-y}$, is prepared as follows:

$Pb(NO_3)_2$ and $Ru(NO_3)_3$ are combined in aqueous solution in an approximately 2.0:1.0 molar ratio of lead to ruthenium. That is, about 3.28 grams of $Pb(NO_3)_2$ and about 1.42 grams of $Ru(NO_3)_3$ (in aqueous solution) are added to 125 ml of distilled water. This solution, after being stirred, is then added with stirring, to about 290 ml of 0.2 M potassium hydroxide and heated to 75° C. Precipitation of a solid occurs immediately. The pH of this reaction medium is measured to be 10.0. The reaction is carried out, with stirring, for 5 days. The solid is then separated by vacuum filtration, washed in distilled water, and dried at 100° C. The pH of the filtrate is measured to be 6.2. X-ray diffraction shows that the reacted product is largely amorphous, the only discernible feature in the x-ray diffraction spectrum being a very broad, diffuse peak centered at about 30° 2$\theta$. When the material is heat treated for 2 hours at 400° C. in air, x-ray diffraction shows that the heat treated product is a crystalline pyrochlore with a lattice parameter of 10.421 Å. The lead to ruthenium molar ratio, as determined experimentally by x-ray fluorescence, is 1.95±0.05:1.0. The formula for this pyrochlore can thus be written as $Pb_2[Ru_{1.36}Pb_{0.64}]O_{7-y}$.

EXAMPLE 9

Table III shows performance data for the electrocatalytic reduction of oxygen in 3 M KOH at 75° C. using the compound obtained by the method of Example 4, thereby illustrating the utility of the catalyst.

TABLE III
ACTIVITY DATA FOR THE ELECTRO-REDUCTION OF OXYGEN IN 3M KOH AT 75° C.

| Current Density (mA/cm$^2$) | Potential (mV vs. RHE) |
| --- | --- |
| 0.5 | 1050 |
| 1.0 | 1050 |
| 5.0 | 992 |
| 10 | 952 |
| 25 | 923 |
| 50 | 900 |
| 100 | 870 |
| 200 | 830 |

EXAMPLE 10

A lead-rich pyrochlore, e.g., $Pb_2[Ru_{2-x}Pb_x]O_{7-y}$, is prepared as follows:

$Pb(NO_3)_2$ and $Ru(NO_3)_3$ are combined in aqueous solution in an approximately 2.0:1.0 molar ratio of lead to ruthenium. That is, about 3.28 grams of $Pb(NO_3)_2$ and about 1.42 grams of $Ru(NO_3)_3$ (in aqueous solution) are added to 125 ml of distilled water. This solution, after being stirred, is then added with stirring to about 100 ml of 0.2 M potassium hydroxide which is at room temperature. At this point the pH is measured to be 2.3 and there is no precipitate. An additional 76 ml of 0.2 M potassium hydroxide is gradually added to the reaction vessel until a stable pH of 4.6 is reached. The formation of a precipitate is observed coincident with the pH reaching this level. The precipitate is slurried about, at room temperature, in the reaction vessel for about 30 minutes. The solid is then separated by vacuum filtration, washed in distilled water, and dried at 100° C. The pH of the filtrate is measured to be 5.2. X-ray diffraction shows that the reacted product is largely amorphous, the only discernible feature in the x-ray diffraction spectrum being a very broad, diffuse peak centered at about 30° 2θ. When the material is heat treated for 2 hours at 400° C. in air, x-ray diffraction shows that the heat treated product consists of a major phase of $RuO_2$ and a second phase of lead-rich ruthenate pyrochlore.

EXAMPLE 11

A lead-rich pyrochlore, e.g., $Pb_2[Ru_{2-x}Pb_x]O_{7-y}$, is prepared as follows:

$Pb(NO_3)_2$ and $Ru(NO_3)_3$ are combined in aqueous solution in an approximately 10.0:1.0 molar ratio of lead to ruthenium. That is, about 16.39 grams of $Pb(NO_3)_2$ and about 1.42 grams of $Ru(NO_3)_3$ (in aqueous solution) are added to 125 ml of distilled water. This solution, after being stirred, is then added, with stirring, to about 200 ml of 0.2 M potassium hydroxide. Precipitation of a solid occurs immediately. The pH of this reaction medium is measured to be 4.9. The reaction is carried out, at room temperature and with stirring, for one hour. The solid is then separated by vacuum filtration, washed in distilled water, and dried at 100° C. The pH of the filtrate is measured to be 5.1. X-ray diffraction shows that the product is largely amorphous, the only discernible feature in the x-ray diffraction spectrum being a very broad, diffuse peak centered at about 30° 2θ. When the material is heat treated for 2 hours at 400° C. in air, x-ray diffraction shows that the heat treated product is a single phase, crystalline pyrochlore having a lattice parameter of 10.309 Å. The composition of this compound is estimated, on the basis of a previously established correlation between lattice parameter and composition for lead ruthenate pyrochlores, to be $Pb_2[Ru_{1.85}Pb_{0.15}]O_{7-y}$.

EXAMPLE 12

A lead-rich pyrochlore, e.g., $Pb_2[Ru_{2-x}Pb_x]O_{7-y}$, is prepared as follows:

$Pb(NO_3)_2$ and $Ru(NO_3)_3$ are combined in aqueous solution in an approximately 10.0:1.0 molar ratio of lead to ruthenium. That is, about 16.39 grams of $Pb(NO_3)_2$ and about 1.42 grams of $Ru(NO_3)_3$ (in aqueous solution) are added to 125 ml of distilled water. This solution, after being stirred, is then added, with stirring, to about 200 ml of 0.2 M potassium hydroxide. Precipitation of a solid occurs immediately. The pH of this reaction medium is measured to be 4.9. The reaction is carried out, at room temperature and with stirring, for one hour. The solid is then separated by vacuum filtration, washed in distilled water, and dried at 100° C. The pH of the filtrate is measured to be 5.1. X-ray diffraction shows that the product is largely amorphous, the only discernible feature in the x-ray diffraction spectrum being a very broad, diffuse peak centered at about 30° 2θ. When the material is heat treated for 5 hours at 600° C. in air, x-ray diffraction shows that the heat treated product is a crystalline pyrochlore having a lattice parameter of 10.253 Å. The x-ray diffraction pattern is in agreement with the x-ray data presented by Longo, Raccah and Goodenough, Mat. Res. Bull., Vol. 4, pp. 191-202 (1969), for $Pb_2Ru_2O_{7-y}$. Thus, by using the method of the present invention stoichiometric, or non-lead-rich pyrochlore is synthesized.

What is claimed is:

1. A method of preparing compounds having the formula:

$$A_2[B_{2-x}A_x]O_{7-y}$$

wherein A is selected from the group consisting of lead, bismuth and mixtures thereof, wherein B is selected from the group consisting of ruthenium, iridium and mixtures thereof, wherein x is a value such that $0 > x > 1.0$ and y is a value such that $0 > y > 1$, comprising:
   (a) reacting A cations and B cations from an aqueous solution in a liquid reaction medium having a pH which is equal to or greater than about 4.5 and less than about 13.5, in the presence of oxygen source at a temperature below about 200° C. for a sufficient time for reaction to occur; and, if amorphous reaction products are obtained,
   (b) subsequently heat treating the reaction products at a temperature of about 200° C. to about 600° C. for a time to convert amorphous reaction products to crystalline pyrochlore reaction product.

2. The method of claim 1 wherein said A cations and B cations are provided in an aqueous solution source which contains A source material selected from the group consisting of lead nitrate, lead oxide, lead chloride, lead acetate, lead carbonate, lead citrate, lead oxalate, bismuth nitrate, bismuth oxide, bismuth chloride, bismuth oxalate, bismuth oxychloride and mixtures thereof and B source material selected from the group consisting of ruthenium chloride, ruthenium nitrate, ruthenium nitrosyl nitrite, iridium chloride, iridium hydroxide and iridium oxalic acid.

3. The method of claim 2 wherein said liquid reaction medium is an aqueous basic solution of alkali metal hydroxide.

4. The method of claim 3 wherein said aqueous basic solution contains a base selected from the group consisting of sodium hydroxide, rubidium hydroxide, cesium hydroxide, potassium hydroxide and mixtures thereof.

5. The method of claim 1 wherein said reacting is performed within the temperature range of about 10° C. to about 100° C.

6. The method of claim 5 wherein said pH is greater than about 10 and less than about 13.5.

7. The method of claim 6 wherein said reacting is performed within the temperature range of about 50° C. to about 80° C.

8. The method of claim 1 wherein A is lead.

9. The method of claim 1 wherein said A cations are provided in a solid source which contains A source material selected from the group consisting of lead nitrate, lead monoxide, lead dioxide, lead chloride, lead acetate, lead tetraacetate, lead carbonate, lead citrate, lead oxalate, bismuth nitrate, bismuth trioxide, bismuth pentoxide, bismuth chloride, bismuth oxalate and bismuth oxychloride, and mixtures thereof.

10. The method of claim 9 wherein said liquid reaction medium is an aqueous basic solution of alkali metal hydroxide.

11. The method of claim 10 wherein said aqueous basic solution contains a base selected from the group consisting of sodium hydroxide, rubidium hydroxide, cesium hydroxide, potassium hydroxide and mixtures thereof.

12. The method of claim 11 wherein said reacting is performed within the temperature range of about 10° C. to about 100° C.

13. The method of claim 12 wherein said pH is greater than about 10 and less than about 13.5.

14. The method of claim 13, wherein said reacting is performed within the temperature range of about 50° C. to about 80° C.

15. The method of claim 1 wherein A is bismuth.

16. The method of claim 1 wherein said B cations are provided in a solid source which contains B source material selected from the group consisting of ruthenium oxide, ruthenium oxyhydroxide, ruthenium chloride, ruthenium nitrate, ruthenium nitrosyl nitrite, iridium chloride, iridium hydroxide, and iridium oxide acid and mixtures thereof.

17. The method of claim 16 wherein said liquid reaction medium is an aqueous basic solution of alkali metal hydroxide.

18. The method of claim 17 wherein said aqueous basic solution contains a base selected from the group consisting of sodium hydroxide, rubidium hydroxide, cesium hydroxide, potassium hydroxide and mixtures thereof.

19. The method of claim 18 wherein said reacting is performed within the temperature range of about 10° C. to about 100° C.

20. The method of claim 19 wherein said pH is greater than 10 and less than about 13.5.

21. The method of claim 20 wherein said reacting is performed within the temperature range of about 50° C. to about 80° C.

* * * * *